(12) United States Patent
Kuncl

(10) Patent No.: US 8,477,028 B2
(45) Date of Patent: Jul. 2, 2013

(54) MISPLACED DEVICE RECOVERY

(75) Inventor: Parker Ralph Kuncl, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 296 days.

(21) Appl. No.: 12/981,797

(22) Filed: Dec. 30, 2010

(65) Prior Publication Data

US 2012/0075098 A1    Mar. 29, 2012

Related U.S. Application Data

(60) Provisional application No. 61/386,341, filed on Sep. 24, 2010.

(51) Int. Cl.
| | | |
|---|---|---|
| *G08B 1/08* | (2006.01) | |
| *G06Q 30/00* | (2006.01) | |
| *H04M 1/00* | (2006.01) | |
| *H04M 3/42* | (2006.01) | |
| *H04L 12/58* | (2006.01) | |
| *H04L 29/06* | (2006.01) | |

(52) U.S. Cl.
USPC .................. 340/539.32; 705/26.9; 455/550.1; 455/412.1; 455/414.2; 713/167

(58) Field of Classification Search
USPC ...................................................... 455/412.1
See application file for complete search history.

(56) References Cited

U.S. PATENT DOCUMENTS

| | | | |
|---|---|---|---|
| 2002/0073314 A1* | 6/2002 | Bhat ............................ 713/167 |
| 2009/0042598 A1* | 2/2009 | Blinnikka et al. ......... 455/550.1 |
| 2009/0149492 A1* | 6/2009 | Fevig et al. .................. 514/300 |
| 2009/0251282 A1* | 10/2009 | Fitzgerald et al. ........... 340/5.31 |
| 2011/0057956 A1* | 3/2011 | Ranford ....................... 345/667 |
| 2011/0145927 A1* | 6/2011 | Hubner et al. ................ 726/26 |

* cited by examiner

*Primary Examiner* — Jennifer Mehmood
*Assistant Examiner* — Pameshanand Mahase
(74) *Attorney, Agent, or Firm* — Lee & Hayes, PLLC

(57) ABSTRACT

Methods, articles, and systems for enabling the return of a misplaced device to a rightful user of the misplaced device are described herein. The misplaced device is configured to communicate with a misplaced device server, indicating to the misplaced device server that the misplaced device has been found. The misplaced device server is configured to provide the misplaced device and a returning user currently in possession of the misplaced device with information describing how to return the misplaced device to the rightful user. The misplaced device server is also configured to communicate with the rightful user, indicating to the rightful user that the misplaced device has been found.

17 Claims, 11 Drawing Sheets

MISPLACED DEVICE RECOVERY

CROSS-REFERENCE TO RELATED APPLICATION

This application claims the benefit of U.S. Provisional Patent Application No. 61/386,341, filed Sep. 24, 2010, to the same inventor as herein, the entire disclosure of which is incorporated herein by reference.

BACKGROUND

The last several decades have witnessed not just an explosion in the number or type of electronic devices available to the consuming public, but also a corresponding reduction in the sizes of such devices. Today, the consuming public can acquire and use a wide variety of electronic devices, such as cellular phones, mobile phones, WiFi phones, netbooks, laptop computers, handheld computers, tablet computers (such as the Apple iPad™), personal organizers, e-reading devices (such as the Amazon Kindle® and the Barnes & Noble Nook® devices), media players and gaming devices. Many of these devices are capable of either or both of wired or wireless telecommunications. For example, cellular or mobile phones are capable of telephonic and data communication over a cellular telecommunications network. Some dual-mode cellular or mobile phones are additionally capable of wireless communications over WiFi. Similarly, e-reading devices can engage in data communications over cellular telecommunications networks. Such devices are available in a variety of compact form factors, allowing such devices to be held by a single hand and placed in a pocket.

In addition, many devices that heretofore have lacked the capability for wireless or wired telecommunications now have such capability. Thus, wristwatches and similar items now frequently possess communications capabilities. Also, larger electronic devices, such as televisions, have communications capabilities.

In all of these cases, however, the portable form factors of such devices make them vulnerable to being lost or stolen. Once found by third parties or law enforcement, it is frequently difficult to determine whom the owner of the device is or how to return the device to the rightful owner or user. For example, cellular or mobile phones frequently incorporate user pass codes or unlock codes that protect important user identifiable information and limit access to device functionality, and thereby do not permit a person who finds such a device to access the rightful owner's personal information or otherwise contact a customer care service. Other types of devices, such as e-readers, computers, netbooks, watches, media players, etc., frequently provide no information whatsoever as to the owner of the device, and frequently have no associated telecommunications or IP-based service provider associated, thereby making it even more difficult to identify the true owner of the device.

In addition, it is frequently difficult for the rightful owner of the device to learn that the device has been found and is available for recovery. In the case of cellular or mobile phones, the owner may only learn that the device has been found, and capable of recovery, if, for example, a finder returns the phone to the rightful owner's telecommunications carrier. In the case of laptop computers and other devices large enough to carry physical identification information, such as a business card on the underside of a laptop computer, the rightful owner may receive a communication from a finding party notifying him or her of the recovery of the device.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Recovery of Misplaced Devices

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

As used herein, a misplaced device is any device that is, for any reason, no longer in the possession or control of its rightful user. A rightful user may be anyone who is entitled to rightfully possess or have custody of a device, such as the owner of the device or a user who has been leant the device, such as a child whose parent has provided the device to her for her use. A returning user is a person who has acquired possession and/or custody of, or otherwise is using, a misplaced device and who wishes to return the device or to find out if the device has been misplaced from a rightful user.

Figure 1:
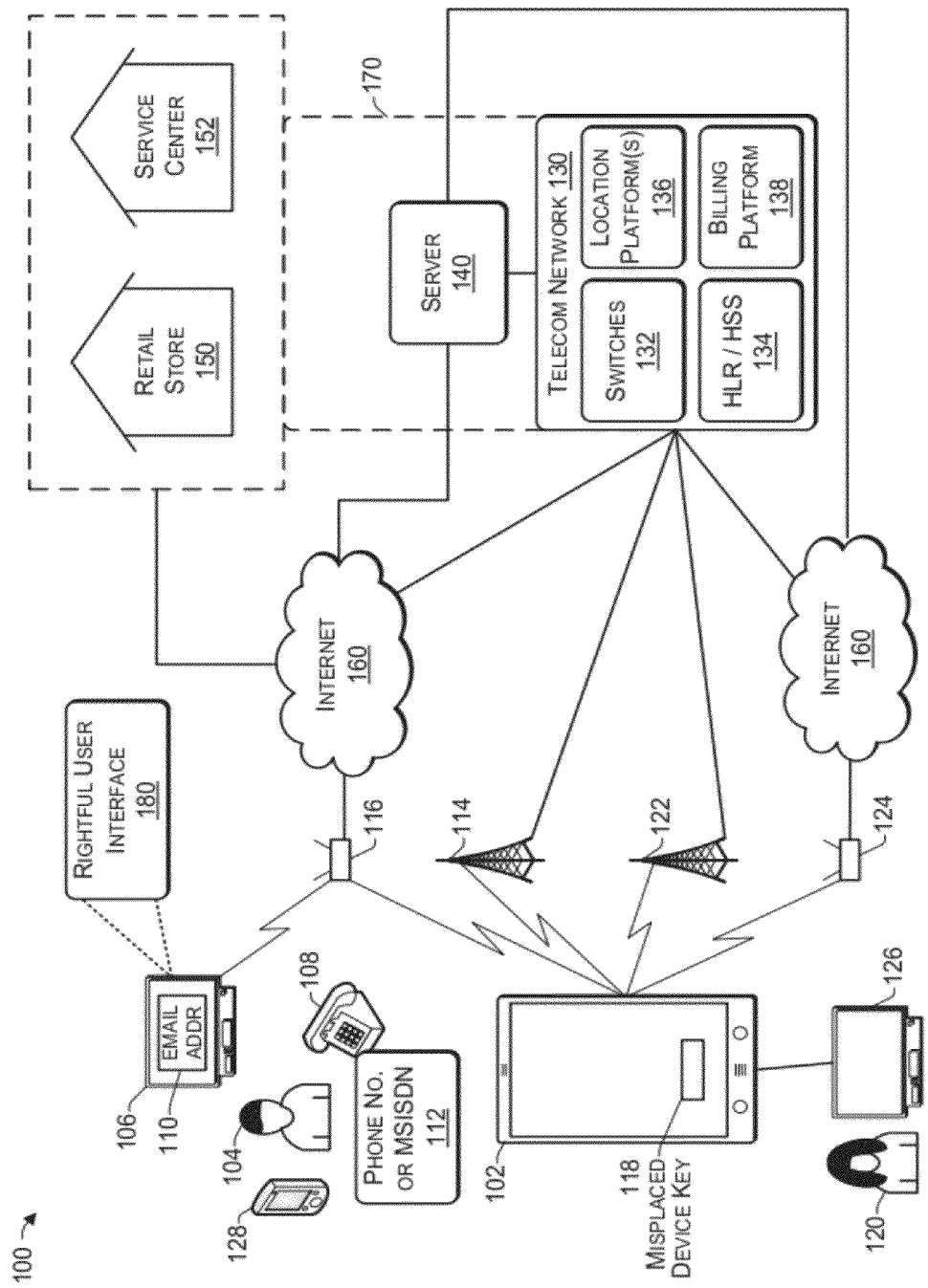
FIG. 1 is a diagram showing a rightful user of a device, a returning user of a device, and an environment allowing for the return of a misplaced device as described herein.

FIG. 1 is a diagram showing a misplaced device 102, a rightful user 104 of the misplaced device, a returning user 120 of the misplaced device, and a method and system for facilitating the return of a misplaced device 102 as described herein. Rightful user 104 owns or otherwise uses or controls misplaced device 102. Rightful user 104 may also own, have access to and/or use other devices with associated communications addresses (e.g., e-mail addresses, SMS addresses, phone numbers, etc.), such as, but not limited to, a computing device 106 and/or a landline telephone 108. For example, computing device 106 may be a desktop computer, laptop, netbook, tablet computer or other device with computing and communication capabilities. While using computing device 106, rightful user 104 may have at least one e-mail address 110.

Landline telephone 108 may also be reachable by third parties by dialing a telephone number or MSISDN 112. Thus, rightful user 104 may be capable of receiving e-mail communications via e-mail address 110 and may be capable of receiving incoming telephone calls via telephone number 112. Although not shown in FIG. 1, rightful user 104 may be capable of receiving incoming communications via a wide variety of other means, such as VoIP telephone calls on computing device 106, SMS messages on device 102, via regular postal mail, via courier service, and other means. Landline telephone 108 may be communicative with a telecommunications network (not shown) or, in some embodiments, may be communicative via Voice over Internet Protocol (VoIP) via an access point 116, which is in turn communicative via the Internet 160, which may be communicative with a telecommunications network 130. Similarly, computing device 106 may be communicative with an access point 116, and thereby communicative with telecommunications network 130. Additionally, a telecommunication device 128, such as a cellular phone, smart phone, or the like, may be used in place of either computing device 106 or landline telephone 108 in some implementations herein. For example, telecommunication device 128 may send and receive e-mails, access the Internet 160, and so forth, in a manner similar to computing device 106. Further, telecommunication device 128 may be configured to receive calls to a phone number or MSISDN 112. Various other devices (not shown) may also perform the functions described herein for computing device 106 and/or landline telephone 108.

Device 102 may be communicative in a wide variety of ways. In an embodiment, device 102 may be a cellular or mobile telephone that can communicate with cell towers 114 and 122. If device 102 is a wireless VoIP phone, or a multi-mode cellular or mobile telephone with VoIP or Unlicensed Mobile Access (UMA)/General Access Network (GAN) capability, it may also be communicative with access points 116 and 124. Device 102 may wirelessly communicate via any known wireless protocol, including WiMax, Bluetooth® and other protocols. In addition, device 102 may communicate through a variety of wired means. For example, device 102 may communicate with computing device 106 via a Universal Serial Bus (USB) cable, firewire, or other wired means. In so doing, mobile device 102 may communicate with one or more telecommunications networks, such as telecommunications network 130, and/or with one or more remote servers, such as a misplaced device server 140.

Example Device

Figure 2:
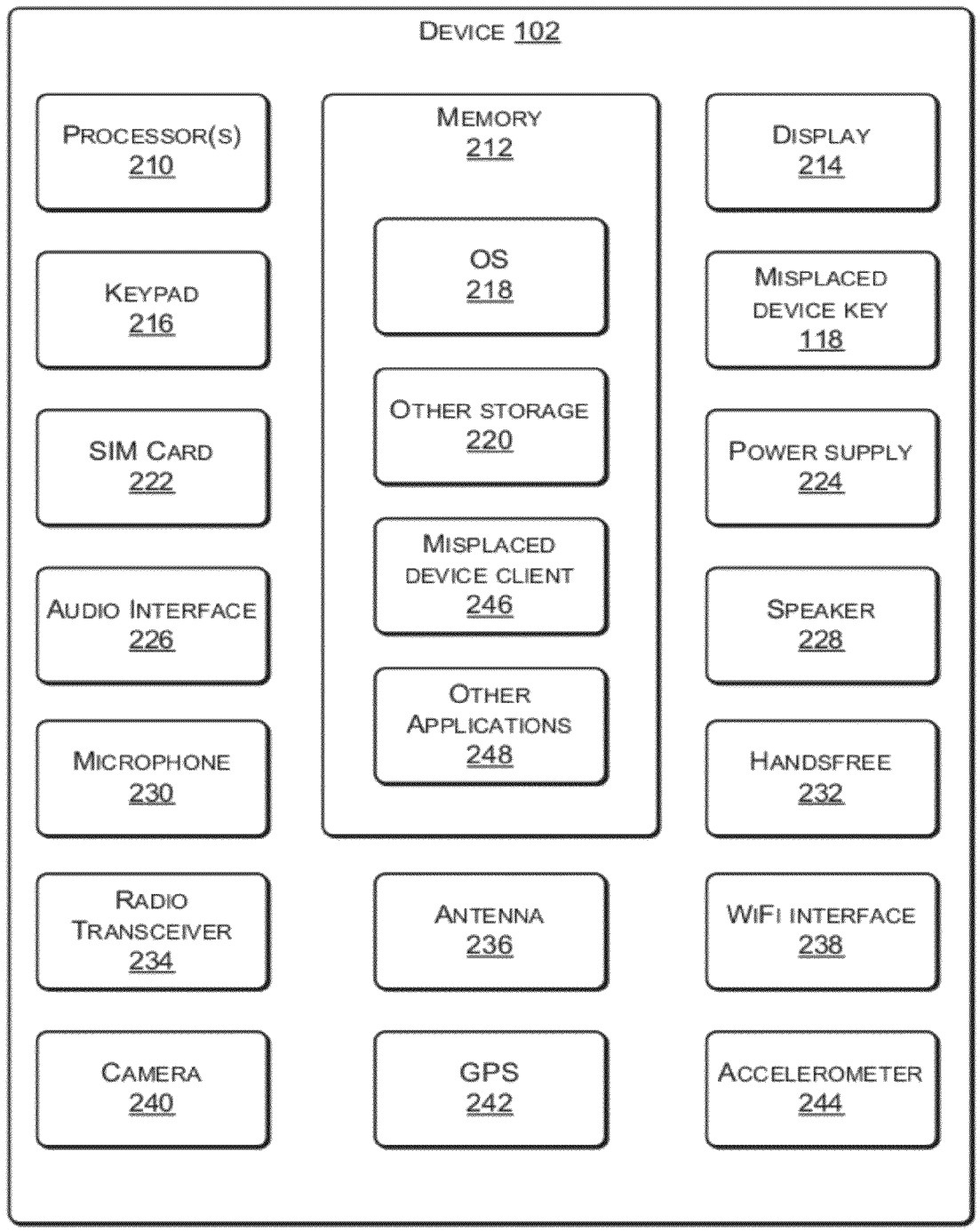
FIG. 2 is a block diagram showing components of a misplaced device.

FIG. 2 shows selected components of an example misplaced device 102, in this case, a misplaced cellular telephone or smart phone. Misplaced device 102 has one or more processors 210, memory 212, a display 214, and may have a keypad 216. Memory 212 is an example of computer-readable media for storing instructions which are executed by the processor(s) 210 to perform the various functions described herein. Memory 212 may include volatile memory and/or non-volatile memory (e.g., RAM, ROM, Flash Memory, miniature hard drive, memory card, removable storage media, or the like) as examples of non-transitory computer-readable media. Misplaced device 102 includes an operating system (OS) 218, which is resident in memory 212 and executable by processor 210. Keypad 216 may be a numeric dialing pad (such as on a typical misplaced device), a multi-key keyboard (such as a conventional QWERTY keyboard), or one or more other types of keypads. Keypad 216 may be implemented with physical buttons and/or via a touch screen (virtual keypad). Keypad 216 may also include a joystick-like controller and/or designated navigation buttons, or the like. Keypad 216 may incorporate a dedicated misplaced device key 118, which returning user 120 may select in order to initiate the return of the misplaced device 102 as described herein. As with keypad 216, misplaced device key 118 may be either a dedicated hard key or button, or a soft key or virtual button presented on a touch-sensitive display. Display 214 may be a liquid crystal display, or any other type of display. For example, display 214 may be a touch-sensitive touch screen, and can then also act as an input device or keypad, such as for providing a soft-key keyboard, navigation buttons, or the like. In touch screen embodiments, display 214 may display a dedicated misplaced device key 118, which returning user 120 may select in order to initiate the return of the misplaced device 102 as described herein.

Misplaced device 102 also includes other data storage 220 within memory 212. Other data storage 220 may be used to store information that is retained when the misplaced device 102 is powered down. For example, applications may use and store persistent information in the other data storage 220. Additionally, in some implementations, misplaced device 102 may include a subscriber identity module (SIM) card 222, which is a removable memory card used to identify a user of the misplaced device 102 to a network service provider, such as an operator or carrier associated with telecommunications network 130.

Misplaced device 102 also includes a power supply 224, which may be implemented as one or more batteries. The power supply 224 might further include an external power source, such as an AC adapter or a powered docking cradle for supplementing or recharging the batteries.

Misplaced device 102 may also include an audio interface 226 that is coupled to a built-in speaker 228 and microphone 230. The audio interface 226 may be used to provide audible messages to and receive audible messages from the user of misplaced device 102. For example, the speaker 228 provides audible output and microphone 230 receives audible input, such as to facilitate a voice conversation. Misplaced device 102 may include a speakerphone feature to enable misplaced device 102 to be held away from the user's head during use, thereby facilitating simultaneous viewing of display 214. Audio interface 226 is also in communication with a hands free jack 232 to permit a wired headset including earphones and a microphone to be plugged in to misplaced device 102 in some implementations to operate in place of built-in speaker 228 and microphone 230.

Misplaced device 102 also includes, in wireless implementations, a radio transceiver and interface 234 that performs the function of transmitting and receiving radio frequency communications via an antenna 236, which may be communicative with cell towers 114 and 122, or access points 116 and 124. The radio interface 234 facilitates wireless connectivity between the misplaced device 102 and various cell towers, base stations and/or access points. Transmissions to and from the radio interface 234 are conducted under control of the operating system 218.

Misplaced device 102 also may include a wireless local area network (LAN) interface 238 that performs the function of transmitting and receiving wireless communications using, for example, the IEEE 802.11, 802.16 and/or 802.20 standards. For example, misplaced device 102 can use WiFi interface 238 to communicate directly with a nearby wireless access point such as for accessing the Internet directly without having to perform the access through the network service provider's network.

Misplaced device 102 also may include a camera 240 for taking video and still photographs using misplaced device 102. Misplaced device 102 also may be outfitted with a global positioning system (GPS) transponder 242 for endowing misplaced device 102 with various GPS capabilities such as navigation, mapping, or the like. Further, misplaced device 102 may include an accelerometer or other motion sensor 244, for determining position, altitude and/or movement of misplaced device 102, such as for adjusting display orientation, or the like.

One or more application programs may be loaded into memory 212 and are run by or in conjunction with operating system (OS) 218. A misplaced device client 246 may be an application program configured to initiate interaction with returning user 120, accept data input from returning user 120, interact with misplaced device server 140, and other functions as described herein. In some implementations, if a user, such as returning user 120, attempts unsuccessfully to access the misplaced device more than a predetermined number of times, the misplaced device client 246 may determine that the device is not in control of the rightful user and may present a return user interface for initiating return of the device to the rightful user 104. For example, if the returning user enters an incorrect password a predetermined number of times in a row, the misplaced device client 246 may present the return user interface, including the misplaced device key 118 to the returning client. The misplaced device client 246 may also send a communication to the misplaced device server 140 with device identification information, location information, and the like. Examples of other application programs 248 include conventional application programs, such as game programs, navigation programs, installation wizard programs, e-mail programs, scheduling programs, PIM (personal information management) programs, word processing programs, spreadsheet programs, Internet web browser programs, and so forth.

While various components, features, and functions of a misplaced device 102 have been described in the implementation illustrated in FIG. 2, it should be understood that numerous other configurations, components, features, and the like may be incorporated into misplaced devices described herein, and that the implementations herein are not limited to any particular configuration for misplaced devices.

In some embodiments, misplaced device 102 may be served by a telecommunications network, such as telecommunications network 130. FIG. 1 shows a cellular telecommunications network 130, which communicates with a variety of wireless devices via a network of cell towers, such as cell towers 114 and 122. Moreover, in some embodiments, telecommunications network 130 features IP capabilities, allowing it to be communicative with a wide variety of devices over the Internet or other IP-based network. In UMA/GAN embodiments, telecommunications network 130 is communicative with UMA/GAN enabled mobile devices.

Telecommunications network 130 may be any type of telecommunications network, such as a landline network, a cellular network, etc. As shown in FIG. 1, telecommunications network 130 is a cellular telecommunications network. Telecommunications network 130 incorporates at least one or more switches 132 such as Mobile Switching Centers (MSCs) or Access Gateways (AGWs), one or more Home Location Registers (HLRs) or Home Subscriber Servers (HSSs) 134, and one or more location platforms 136. Location platforms 136 may be any type of location platform, such as GPS location system, A-GPS (Assisted GPS), TDOA (Time Difference of Arrival), and other technologies. In addition, telecommunications network 130 includes a billing server 138 which manages, for example, prepaid and postpaid billing records and other records concerning a subscriber's account.

Figure 3:
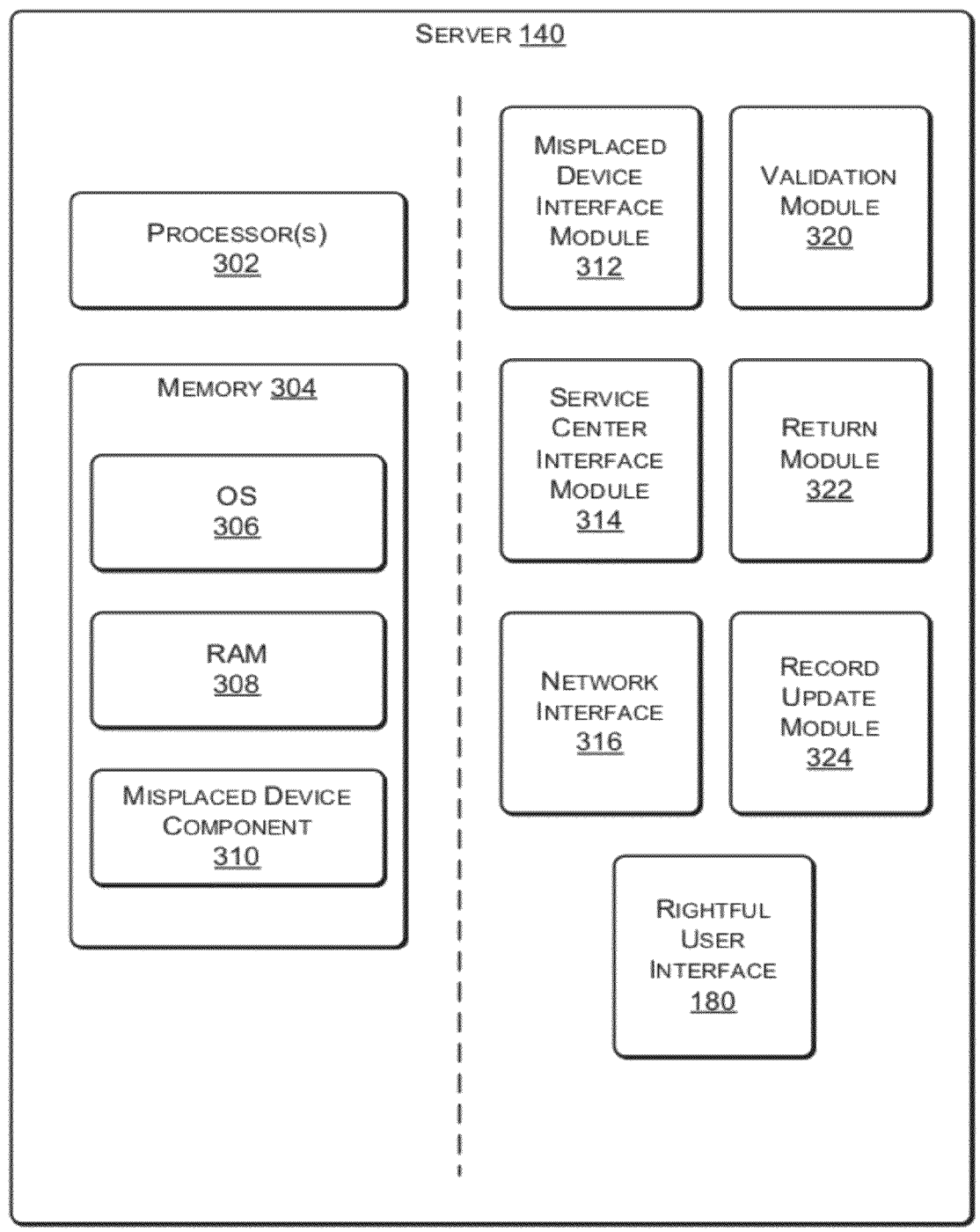
FIG. 3 is a block diagram showing components of a misplaced device server.

In some embodiments, telecommunications network 130 may incorporate misplaced device server 140. Thus, FIG. 3 shows the components of a misplaced device server 140. Misplaced device server 140 may be any type of server that is directly or indirectly communicative with misplaced device 102. Further, misplaced device server 140 may be communicative with one or more retail store locations 150 or service center locations 152, and may be communicative with a telecommunications network, such as telecommunications network 130. In some embodiments, misplaced device server 140 may be incorporated into telecommunications network 130. Thus, dashed line 170 indicates that, in some embodiments, misplaced device server 140 is integrated into telecommunications network 130.

Example Server

FIG. 3 shows the components of a misplaced device server 140. Misplaced device server 140 may be any type of server computing device or other suitable computing device (or multiple computing devices) that is capable of communication with one or more misplaced devices 102. Misplaced device server 140 is configured to receive messages from misplaced device 102 in the event that a returning user 120 selects a hard or soft misplaced device key 118 on misplaced device 102. Misplaced device server 140 may manage communications to, from and among misplaced device 102, one or more service locations, such as retail store location 150 or service center location 152, and telecommunications network 130.

Misplaced device server 140 has one or more processors 302 and memory 304. Memory 304 is an example of computer-readable media for storing instructions, which are executed by the processor(s) 302 to perform the various functions described herein. Memory 304 may include volatile memory and/or non-volatile memory (e.g., RAM, ROM, Flash Memory, miniature hard drive, memory card, removable storage media, or the like), as examples of non-transitory computer-readable media, and includes an operating system (OS) 306. Memory 304 also may include volatile and/or non-volatile memory 308 dedicated to storing data relevant to the method and system disclosed herein, such as information sent to or received from misplaced device 102, retail store location 150, service center location 152, and/or telecommunications network 130. Memory 304 additionally includes a misplaced device component 310 which is executed by processor(s) 302 as disclosed herein.

Misplaced device server 140 is directly or indirectly communicative with one or more of misplaced devices 102 via a misplaced device interface module 312, retail store locations 150 or service center locations 152 via a service center interface 314, customer record or network record repositories via a telecommunications network interface 316, and with an alternative device associated with rightful user 104, such as computing device 106 via application 180.

Misplaced device server 140 is at least communicative with one or more misplaced devices 102 via the misplaced device interface module 312. Misplaced device server 140 may send or receive data from misplaced device 102 directly or indirectly in any manner. In an embodiment, misplaced device component 310 may be configured to have an e-mail address that receives incoming e-mail communications from misplaced device 102 via the misplaced device interface module 312. For example, the e-mails received by misplaced device server 140 from misplaced device 102 may contain certain information that may be extracted by processor(s) 302. In an embodiment, misplaced device server 140 may send and receive data with misplaced device 102 via an HTML interface provided by misplaced device interface module 312. In that embodiment, misplaced device interface module 312 may include a Web server that hosts an application communicative with misplaced device 102. In some implementations, selection of the misplaced device key 118 on the misplaced device 102 may initiate a Web-based interaction between misplaced device 102 and misplaced device server 140, via misplaced device interface module 312. Those of skill in the art will understand that other embodiments may exist.

Among the information that may be received by misplaced device server 140 via misplaced device component 310 utilizing misplaced device interface module 312 are one or more misplaced device identifiers. Examples of such misplaced device identifiers that may be received include equipment identifiers (e.g., International Mobile Equipment Identity or IMEI), one or more subscriber identifiers (e.g., an International Mobile Subscriber Identifier or IMSI), rightful user information (such as the rightful user's name, mailing address, e-mail address, alternate addresses, etc.), returning user information (such as the returning user's name, mailing address, e-mail address, etc.), and other information. Misplaced device component 310 may additionally provide information to misplaced device 102, such as query information regarding information requested from returning user 120.

Misplaced device server 140 may additionally be communicative with one or more devices used by rightful user 104, such as computing device 106 or landline phone 108 via a rightful user interface 180. In an embodiment, rightful user interface 180 may be a Web interface accessible via computing device 106. In that embodiment, rightful user 104 may access rightful user interface 180 by accessing a Web site, providing certain login credentials, and then accessing interfaces that permit rightful user 104 to, for example, report his or her misplaced device 102 to be lost or stolen. In an embodiment, rightful user interface 180 may be an HTML interface that is accessible via an alternate device, such as a cellular phone other than misplaced device 102, executing a misplaced device application enabling communication with misplaced device server 140. In an embodiment, rightful user interface 180 may be an e-mail client, text messaging client, or other messaging client which can generate and transmit, and receive, e-mail, text message or other messaging communications from an address associated with rightful user 104, such as e-mail address 110.

Misplaced device server 140 may additionally be communicative with one or more retail store locations 150 or service center locations 152 via a service center interface module 314. Such service center interface module 314 may communicate with retail store locations 150 or service center locations 152 in any manner. In an embodiment, service center interface module 314 may generate and dispatch e-mail(s), text messages or other messages to one or more retail store locations 150 or service center locations 152, which messages contain information sufficient to notify such locations of the expected receipt of an incoming misplaced device 102 or to generate a return mailer according to certain parameters (e.g., addressed to an address provided by returning user 120). In an embodiment, service center interface module 314 may update a service center 152 that consists of the billing platform 138 associated with telecommunications network 130, thereby affecting the temporary suspension of wireless or telecommunications services provided by telecommunications network 130 to misplaced device 102. In an embodiment, service center interface module 314 may be communicatively coupled to one or more retail store locations 150 or service center locations 152, thereby providing real-time communication, such as of information sufficient for the generation and dispatch of a return mailer to a returning user 120.

Misplaced device server 140 may additionally be communicative with a telecommunications network 130, or to nodes within a telecommunications network 130, via a network interface 316. In an embodiment, misplaced device server 140 may, itself, be a node within a telecommunication network 130, and thereby directly or indirectly communicative to one or more other nodes within telecommunications network 130. As depicted in FIG. 1, dashed line 170 indicates the misplaced device server 140 is itself a node within telecommunications network 130. In an embodiment, network interface 316 may communicate with multiple nodes within telecommunications network 130, such as switches 132, HLR/HSS 134, location platform 136, or billing platform 138. Network interface 316 may communicate information sufficient, for example, to allow a switch 132 to terminate any existing communication underway between misplaced device 102 and a third party. Network interface module 316 may communicate information sufficient to update subscription or customer information of rightful user 104, which may reside within HLR/HSS 134, to indicate that misplaced device 102 has been misplaced and telecommunications services provided to misplaced device 102 by telecommunications network 130 should be limited or suspended. Network interface module 316 may communicate information sufficient to query location platform 136, which then may perform a location query regarding misplaced device 102 and return a location to network interface module 316. Network interface module 316 may communicate information sufficient to update a billing record associated with rightful user 104 in a billing platform 138. Those of skill in the art will understand that misplaced device server 140 is capable, via network interface module 316, to establish other direct and indirect communications with other nodes within telecommunications network 130.

Misplaced device server 140 may additionally include a validation module 320, which validates received information from at least misplaced device 102, but may also include information received from rightful user 104 via rightful user interface 180, retail store locations 150, service center 152, or telecommunications network 130 (or any nodes within telecommunications network 130). In an embodiment, misplaced device 102 may provide information to misplaced device server 140 in response to returning user 120 selecting misplaced device key 118, such as one or more misplaced device identifiers (e.g., International Mobile Equipment Identity or IMEI), one or more subscriber identifiers (e.g., an International Mobile Subscriber Identifier or IMSI), rightful user information (such as the rightful user's name, mailing address, e-mail address, alternate addresses, etc.). In an embodiment, returning user 120 may be prompted to enter a variety of information, such as his or her name, mailing address, return method preferences, etc. Validation module 320 may validate such received information. In an embodiment, if misplaced device server 140 receives device identifiers from misplaced device 102, it may initiate a query, through telecommunications network interface 316, to HLR/HSS 134, to validate that the received identifiers are associated with a misplaced device which, or a rightful user who, is validly subscribing to telecommunications services from telecommunications network 130. If validation fails, the validation module 320 may report out to misplaced device 102, via misplaced device interface module 312, that misplaced device 102 is not authorized to use telecommunications network 130. In an embodiment, validation module 320 may receive, from returning user 120 via misplaced device 102, certain personal identification and address information concerning returning user 120. Validation module 320 may then query and validate whether the received information is truthful information, such as confirming that received address information corresponds to a known or valid address. Those of skill in the art will understand that validation module 320 may perform a wide variety of validation services.

Misplaced device server 140 may additionally include a return module 322, which manages generation of return directions to misplaced device 102, retail store(s) 150, service center(s) 152, and telecommunications network 130 (including all nodes therein). In an embodiment, return module 322 may receive information (which may have been validated by validation module 320) sufficient to generate return directions. In an embodiment in which a returning user 120 has indicated his or her interest in returning misplaced device 102 to a nearby retail store 150, return module 322 may receive information regarding the name and address of returning user 120, the location of misplaced device 102, and the locations of retail store locations 150, which return module 322 then processes to identify one or more retail store locations 150 that are geographically near misplaced device 102, and then communicates such information to misplaced device 102. In addition, return module 322 may additionally communicate this information to one or more retail store locations 150 that are geographically near misplaced device 102, such that representatives working at retail store locations 150 are aware that returning user 120 may return misplaced device 102, and also providing information sufficient for such representatives to forward misplaced device 102 to another retail store 150 (such as a retail store that is geographically near a home address associated with rightful user 104), a service center location 152, or to another destination (such as the home address associated with rightful user 104). In an embodiment in which returning user 120 has indicated his or her interest in receiving a return mailer, return module 322 may receive information regarding the name and address of returning user 120. Return module 322 may then send a communication to service center location 152 containing information sufficient for service center location 152 to prepare a return mailer for dispatch to the address provided by returning user 120. In an embodiment in which returning user 120 has indicated his or her interest in receiving a return mailer via e-mail, return module 322 may communicate return mailer information to, for example, an e-mail address provided by returning user 120, and which may include prepaid postage, a form of return mail label, etc. In addition, return module 322 may additionally communicate this information to a service center location 152 such that representatives working at service center location 152 are aware that returning user 120 may return misplaced device 102, and also providing information sufficient for such representatives to forward misplaced device 102 to a retail store 150 (such as a retail store that is geographically near a home address associated with rightful user 104), a service center location 152, or to another destination (such as the home address associated with rightful user 104).

Misplaced device server 140 may additionally include a record update module 324, which updates relevant databases, such as a database resident in memory 304, and other databases, such as HLR/HSS 134 or billing platform 138. Record update module 324 may provide such databases with records of all communications received and sent by misplaced device server 140, actions taken (such as deactivating or suspending service to misplaced device 102 in response to activation of misplaced device key 118), etc.

Returning to FIG. 1, retail store location(s) 150 may be any type of physical location(s) or places that returning user 120 may visit in order to deliver custody of misplaced device 102 to a representative at retail store location 150. Most typically, retail store location 150 may be a retail store or lost and found office, but may be any type of location that is capable of accepting receipt of misplaced device 102 as described herein.

Service center location 152 may be any type of physical location or places that may not necessarily be physically accessible by returning user 120, but which may accept delivery of misplaced device 102 via mail, courier, etc. Service center location 152 is communicative with misplaced device server 140 and may receive communications from misplaced device server 140 sufficient to initiate preparation of shipping instructions, materials, envelopes, etc., and dispatching such materials to an address associated with returning user 120. Such materials may be physical materials, such as a return envelope, a return mailing label, prepaid postage or prepaid shipping materials, etc. In other embodiments, service center location 152 may be capable of transmitting virtual shipping materials, allowing returning user 120 to receive an e-mail attaching a return mailing label, prepaid postage or prepaid shipping materials, etc. Such an e-mail could be received, for example, at a computing device 126 of the returning user 120, such as a desktop computer, laptop, netbook, smart phone, tablet computer, or the like. Service center location 152 may also be capable of receiving misplaced device 102, and handling further processing, such as repackaging, refurbishing and forwarding misplaced device 102 to rightful user 104.

Example User Interfaces

Figure 4:
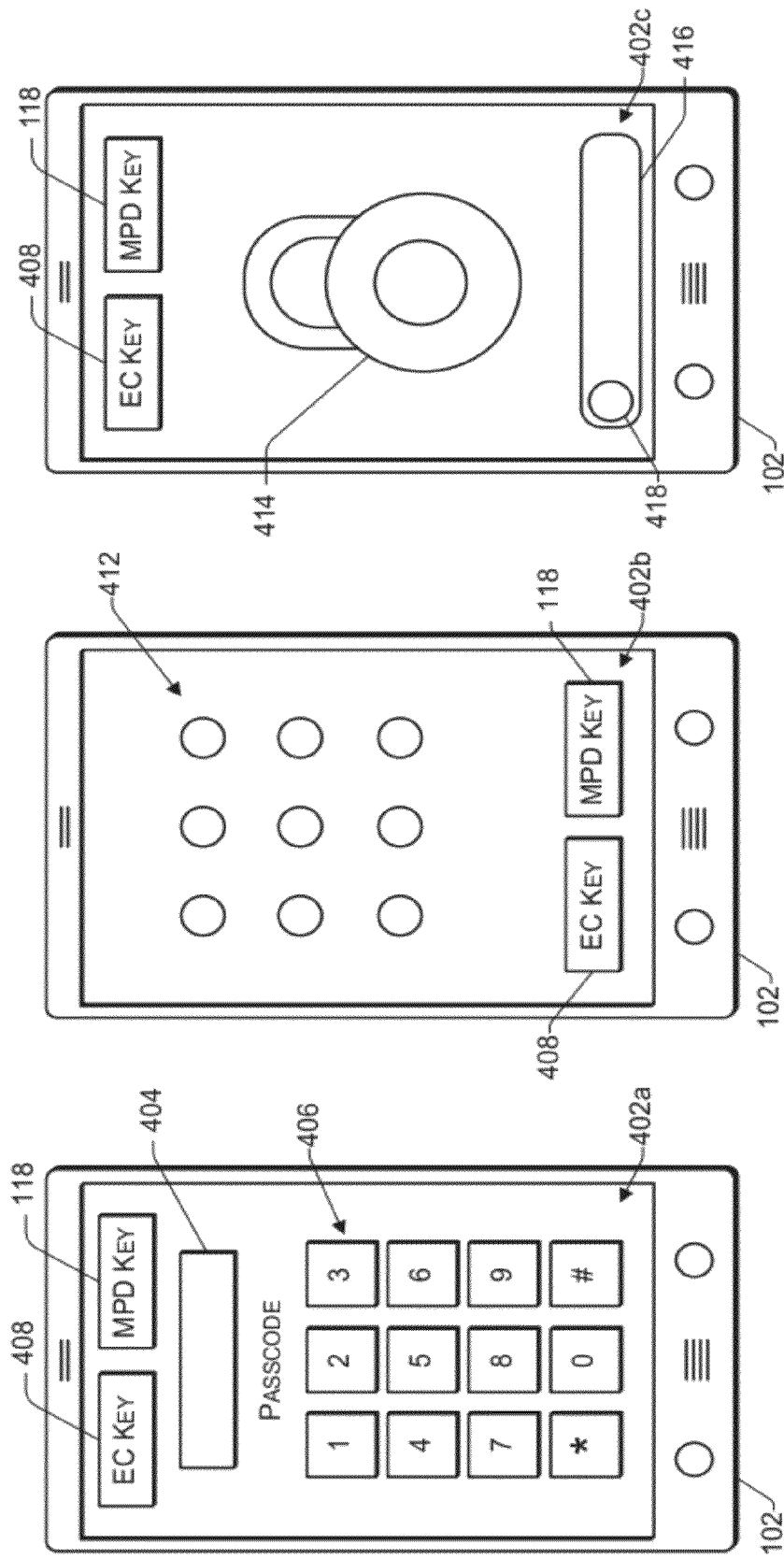
FIGS. 4A, 4B and 4C are example authentication user interfaces for display on a misplaced device.

FIGS. 4A, 4B and 4C show exemplary authentication user interfaces for display on misplaced device 102. Such authentication user interfaces are frequently used on cellular phones, mobile phones, smart phones, tablet computers, etc., in order to permit a user to enter authentication or security information to unlock or otherwise enable the user to use the device. Authentication user interfaces consist of any user interface that requires user input or user interaction with the user interface in order to authenticate the user's authority to use the device.

FIG. 4A presents an authentication user interface 402a requiring the input of a pass code or password to authenticate the user. The user is presented with a pass code field 404, a ten key dial pad 406, an Emergency Call (EC) key 408 and a misplaced device or misplaced device (MPD) key 118. Those of skill in the art will understand that the presented ten key dial pad 406 is typical of a dial pad utilized in a touch screen embodiment. Alternatively, the device may incorporate a physical keypad, such as a ten key keypad or a QWERTY keypad, which may be utilized to input a pass code. By inputting a pass code, which may appear or be indicated in the pass code field, the user may initiate an authentication against a pass code known to the device, to a communications network that serves the device, or to a remote server or node (such as a server or node accessible via the Internet) which, when recognized, allows the user to access the device's functionality.

In an embodiment presented in FIG. 4B, an authentication user interface 402b includes a graphic design or puzzle 412 via which a user may draw an authentication design in which the user connects dots in a unique, identifiable fashion. Those of skill in the art will understand that the presented arrangement of dots is typical of an arrangement utilized in a touch screen embodiment. By touching the arrangement of dots and moving one's finger in a unique, identifiable path, the user may initiate an authentication against a design known to the device, to a communications network that serves the device, or to a remote server or node (such as a server or node accessible via the Internet) which, when recognized, allows the user to access the device's functionality. Those of skill in the art will understand that any type of graphical design or puzzle may be utilized in such embodiments.

In an embodiment as presented in FIG. 4C, an authentication user interface 402c presents the image of a closed lock 414 and a graphical unlock bar 416. Graphical unlock bar 416 features a circle 418 which, when touched by a user and moved to the right, unlocks misplaced device 102. In this embodiment, the performing of the motion of moving the circle 418 from left to right completes the authentication gesture and enables a user to access the device's functionality. Those of skill in the art will understand that this embodiment is typical of touch screen embodiments.

Also presented in each of authentication user interfaces 402a, 402b and 402c of FIGS. 4A, 4B and 4C is an Emergency Call key 408. Those of skill in the art will understand that Emergency Call key 408 presented is typical of a touch screen embodiment. In other embodiments, misplaced device 102 may include a dedicated Emergency Call physical key 408. In other embodiments, misplaced device 102 may not provide any soft or physical key for emergency calling, but may instead permit emergency calls (such as a 911 or 112 call) directly from a keypad 406, as presented in FIG. 4A, for instance by the user physically typing the numbers for the emergency call. In some embodiments, Emergency Call key 408 may not be incorporated.

Also presented in each of authentication user interfaces 402a, 402b and 402c of FIGS. 4A, 4B and 4C is a misplaced device key 118. Those of skill in the art will understand that misplaced device key 118 is a soft key typical of touch screen embodiments. In other embodiments, misplaced device key 118 may be a dedicated lost device physical key incorporated into, among or near a ten key keypad, a QWERTY keypad, or other keypad. Thus, a returning user 120 who wishes to return misplaced device 102 may touch or press misplaced device key 118 to initiate the method and system as described herein.

Figure 5:
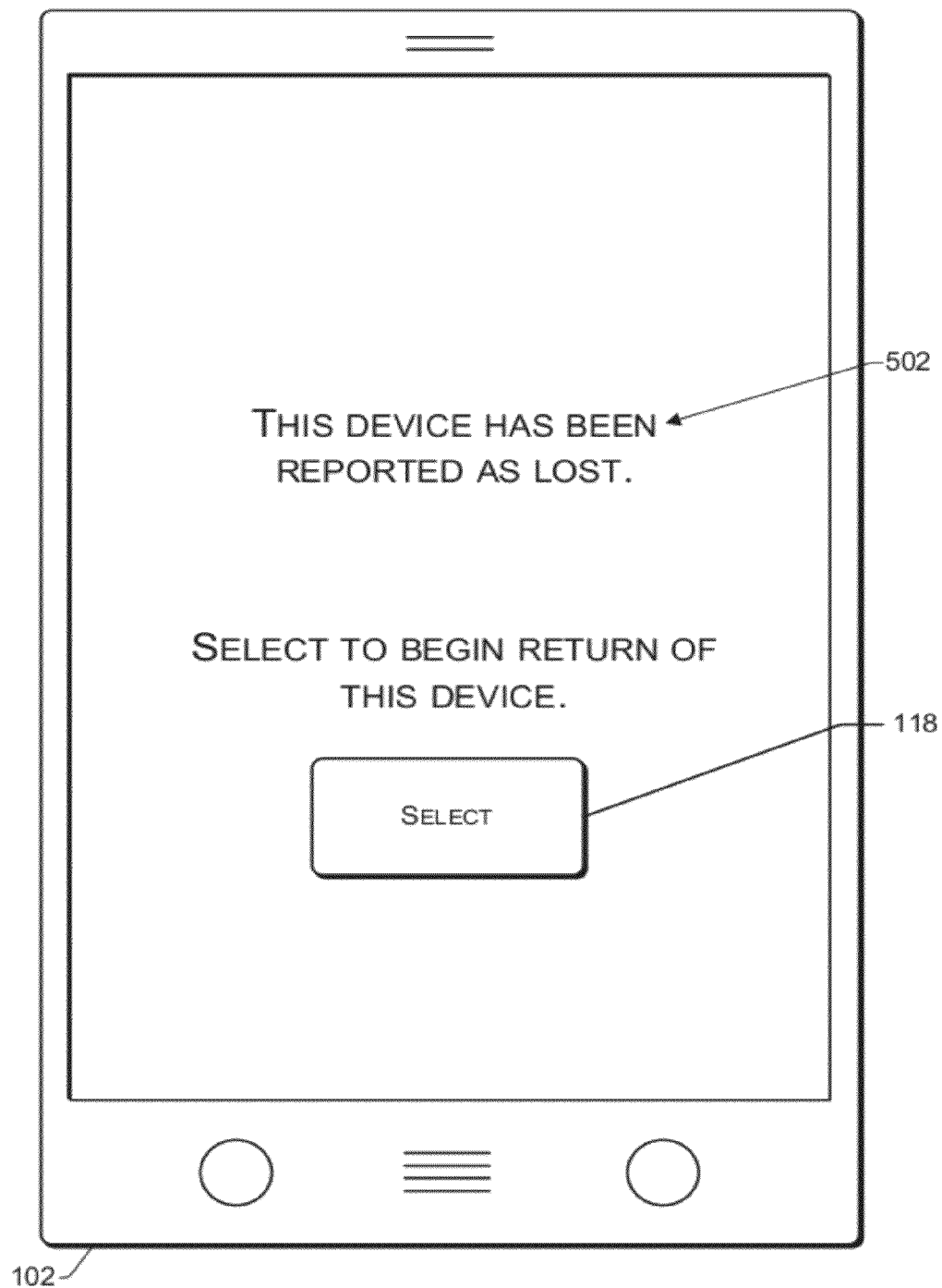
FIG. 5 is an example of a returning user interface displayed when a rightful user remotely identifies a misplaced device as being misplaced.

FIG. 5 shows an exemplary user interface 502 for display on misplaced device 102 if rightful user 104 has indicated, via an alternate device (e.g., computing device 106 or landline phone 108) to misplaced device server 140, that misplaced device 102 has been misplaced or is otherwise no longer in control of the rightful user. In this embodiment, misplaced device server 140 has subsequently communicated to misplaced device 102 that it has been reported misplaced which, when received by misplaced device 102, has been recognized by misplaced device client 246 as a trigger to launch user interface 502 or otherwise initiate presentation of the misplaced device key 118. User interface 502 conveys a prose message stating the misplaced device 102 has been reported as lost, and additionally conveying that returning user 120 may initiate return of misplaced device 102 by selecting misplaced device key 118. Those of skill in the art will understand that the prose message may be conveyed in other media formats, such as audio, video, or other formats. Misplaced device client 246 may additionally initiate other actions on misplaced device 102, such as lockdown of certain device functionality, wiping of personal information associated with rightful user 104, etc.

Figure 6:
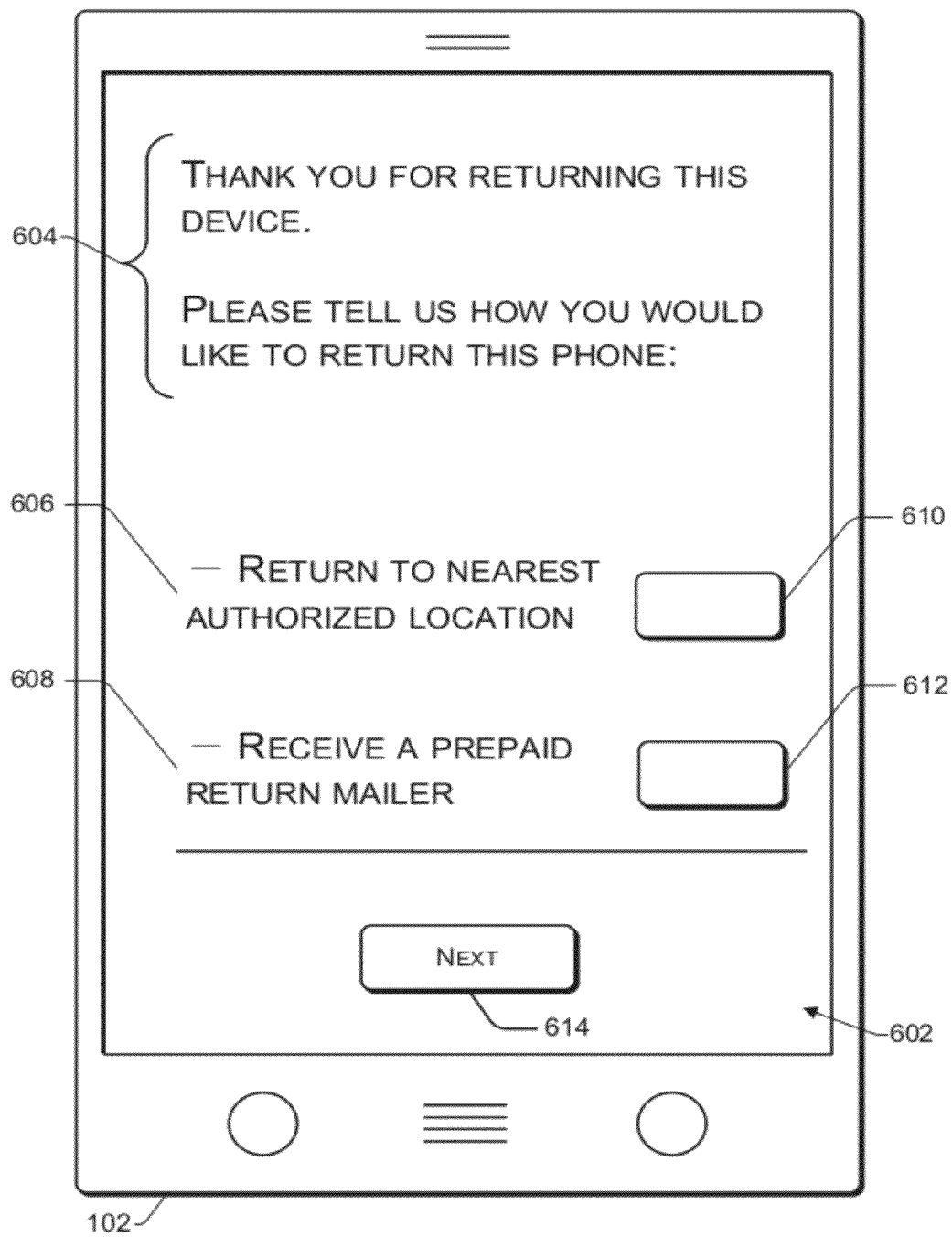
FIG. 6 is an example of a returning user interface.

FIG. 6 shows an exemplary device return user interface 602. In an embodiment, returning user 120 may, after selecting misplaced device key 118, encounter a user interface displaying an assortment of return options. Return user interface 602 may present an introductory message, such as prose message 604, informing returning user 120 that he or she has initiated a process to return misplaced device 102 to rightful user 104, and requesting an indication of how returning user 120 wishes to proceed with returning misplaced device 102. Those of skill in the art will understand that message 604 may be in other media formats, such as audio, video, or other formats.

Among the most basic return options (not shown) are an option to initiate a telephone call to the rightful user's designated phone number 112 such as a landline phone to which the rightful user has access and at which he or she wishes to receive incoming calls regarding lost device 102. Similarly, user interface 602 may present an option for returning user 120 to initiate an e-mail communication to an e-mail address that rightful user 104 may have designated for receipt of e-mail communications regarding misplaced device 102, such as e-mail address 110.

Returning user 120 may want the option of communicating with a misplaced device return service as disclosed herein, which may interact indirectly with the rightful user 104. For example, rightful user 120 may not want to provide any personal information to either the rightful user 104 or the misplaced device return service, but may instead wish to simply deliver the misplaced device to a designated return location, such as either retail store location 150 or service center 152. In that instance, the returning user may select "Return to Nearest Location" as his or her return option, which then triggers the device to identify where the nearest authorized return location is located. User interface 602 also presents options for initiating return of misplaced device 102, including an option 606 for return of misplaced device 102 to a retail store location, which in wireless telecommunications embodiments may be a retail store associated with a telecommunications carrier providing service to misplaced device 102. If returning user 120 wishes to select this option, he or she may touch a check box 610. Return user interface 602 also presents the option for returning user 120 to receive a prepaid return package and mailer, as presented in prose message 608, which returning user 120 may select by checking box 612. In some embodiments, return user interface 602 may present a "NEXT" key 614, which returning user 120 may select once he or she has finally decided upon selection of an option. Those of skill in the art will understand that prose messages may be in other media formats, such as audio, video, or other formats. Those of skill in the art will understand that returning user 120 may interact with user interface 602 other than via a touch screen. For example, misplaced device 102 may be enabled with speech identification software which permits it to receive and process verbal communications from returning user 120.

Figure 7B:
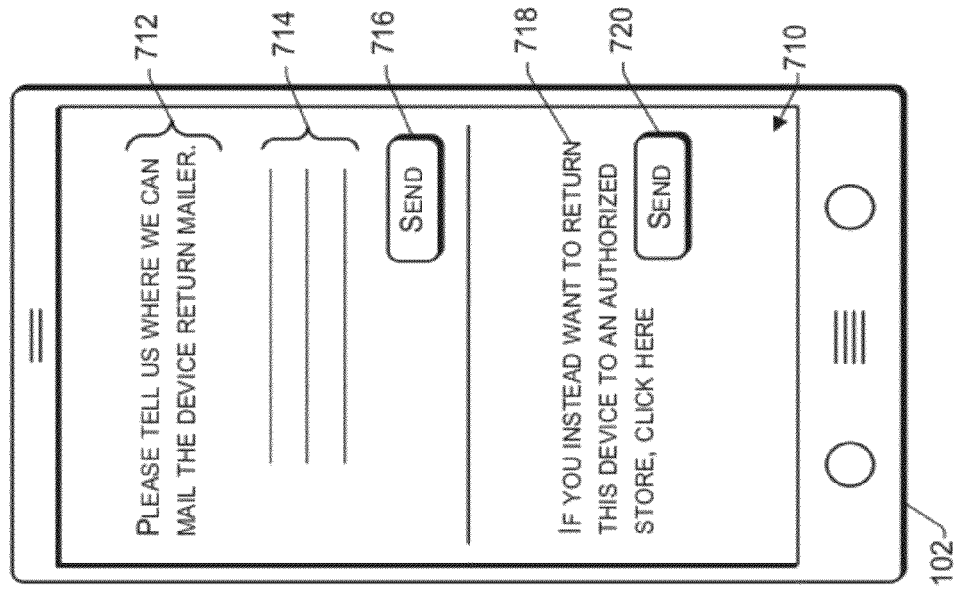
FIGS. 7A and 7B are examples of returning user interfaces.
Figure 7A:
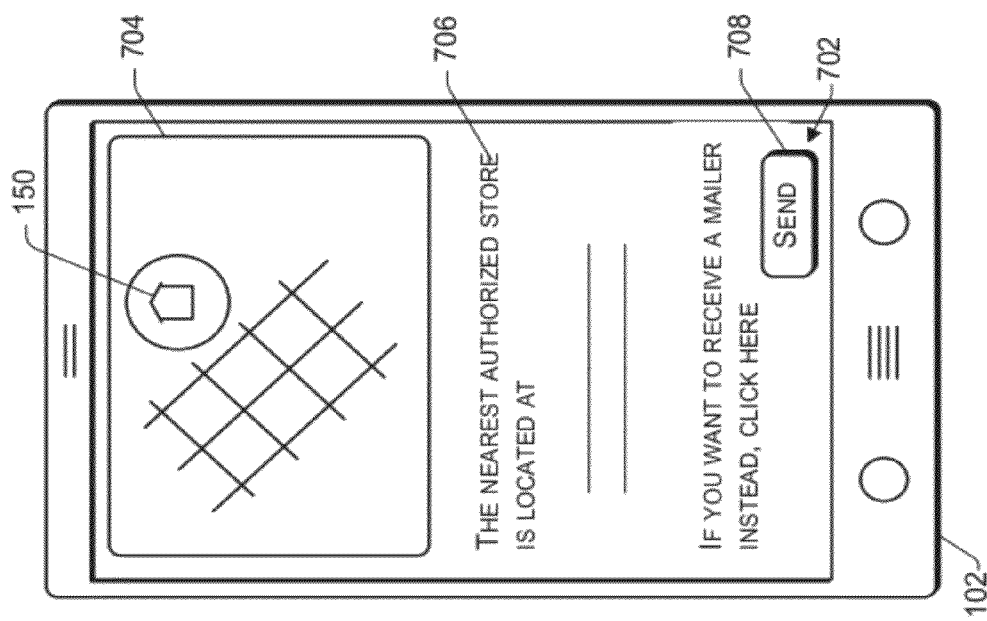

If returning user 120 has selected box 612, then misplaced device 102 may present a new return user interface 702 as depicted in FIG. 7A. Returning user interface 702 may be generated directly by misplaced device 102, or it may be generated and provided to misplaced device 102 by a network-based or remote server or node, such as misplaced device server 140, via HTML or other interface. In either embodiment, misplaced device 102 has, following its acceptance of the selection of box 612 by returning user 120, initiated a location query through a location determination technology compatible with misplaced device 102. For example, misplaced device 102 may feature GPS capability, such as that provided by GPS unit 242, and be able to make its own determination of its location. In other embodiments, misplaced device 102 may initiate a location query via a network-based location platform 136. In other embodiments, a rough location determination may be made by identifying a cellular tower or cell site that is serving misplaced device 102, by polling a list of MAC addresses or similar addresses for access points serving misplaced device 102, or from other types of network components in communication with misplaced device 102. The location may be reported to misplaced device 102, to a network-based or remote location such as misplaced device server 140, or both. If reported to misplaced device 102, the location may be compared to a known list of retail store locations 150 with corresponding known locations, with resulting identification of the nearest retail store locations 150 to misplaced device 102. Misplaced device 102 may then present returning user 102 with a map 704 showing one or more nearby retail store locations 150, to which returning user 120 may return misplaced device 102. Alternatively, this determination may be made at a network-based or remote server or node, such as misplaced device server 140, and provided to misplaced device via HTML or other interface.

Return user interface 702 may present other relevant information to returning user 120. For example, return user interface 702 may provide additional messages 706, including address information, hours of operation, contact names, and other information for retail store(s) 160. Further, return user interface 702 may represent an option 708 by which returning user 120 may elect instead to select an alternate mode for return of misplaced device 102, such as receipt of a prepaid return mailer.

If returning user 120 has selected a prepaid return mailer option, misplaced device 102 may present a return user interface such as return user interface 710, as illustrated in FIG. 7B. Return user interface 710 may present a message such as prose message 712 in which returning user 102 is requested to provide his or her preferred mailing address for receipt of a prepaid return mailer. Return user interface 710 also presents one or more data input fields 714, in which he or she can provide address information as requested in message 712. Return user interface 710 may additionally provide an alternate return option, such as described in prose message 718, in which returning user 120 may elect to return misplaced device 102 to a retail store location. Returning user 120 may select such option by checking or touching button 720.

Example Processes

FIGS. 8A, 8B, 8C and 9 show flow diagrams corresponding to example processes according to some implementations disclosed herein. In the flow diagrams, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include modules, programs, objects, components, data structures, and the like that perform particular functions or implement particular abstract data types. The order in which the blocks are described is not intended to be construed as a limitation, and any number of the described operations can be combined in any order and/or in parallel to implement the processes. Further, those of skill in the art will understand that the operations disclosed herein may be performed on misplaced device 102, on misplaced device server 140, on a combination of the two, or at other computing devices, such as servers, nodes, switches, or the like, in the telecommunications network 130. For example, misplaced device 102 may execute an application that performs all or most of the operations described in FIGS. 8A, 8B, 8C and 9. Alternatively, misplaced device 102 may launch a browser that opens one or more web interfaces that interact with misplaced device server 140, or reside on misplaced device server 140, and perform the operations described herein.

At 802, a misplaced device key 118 is presented on misplaced device 102. Misplaced device key 118 may be a dedicated hard key or a soft key appearing in a user interface. In soft key embodiments, misplaced device key 118 may be presented upon the receipt by misplaced device 102 of a communication indicating that misplaced device 102 has been misplaced. For example, rightful user 104 may have communicated to misplaced device server 140, such as via a Web site associated with misplaced device server 140, that misplaced device 102 has been misplaced, and misplaced device server 140 may have initiated a communication to misplaced device 102 accordingly. In soft key embodiments, misplaced device key 118 may be presented whenever misplaced device 102 otherwise determines, through any means, that it is no longer in the custody or possession of rightful user 104. In soft key embodiments, misplaced device 102 may present misplaced device key 118 as part of an unlock user interface, when misplaced device 102 is in a locked or security protected state. Those of skill in the art will understand, however, that not all misplaced devices require an unlock state and that some misplaced devices may incorporate dedicated hard or soft misplaced device keys, such as by presenting a misplaced device key on a home screen. In any of these embodiments, the misplaced device 102 offers or presents a misplaced device key 118 that, at 804, a returning user selects.

At 806, misplaced device 102 launches a misplaced device client or application 246. Such application 246 may, among other things, directly generate and present the user interfaces discussed herein, whereby information can be conveyed to and received from returning user 120. In an embodiment, misplaced device client or application 246 may initiate a Web-based or browser-based user experience, wherein application 246 opens a browser that automatically presents HTML or similar content resident on misplaced device server 140. Misplaced device client or application 246 may also perform a number of other functions automatically, such as, at 808, initiating the secure deletion or encryption of information resident on misplaced device 102, such as personal information associated with rightful user 104. Further, misplaced device client or application 246 may initiate a location determination via GPS 242.

At 810, misplaced device client or application 246 will initiate a communication to misplaced device server 140 indicating that returning user 120 has selected misplaced device key 118, and is initiating return of misplaced device 102. Such communication will additionally include one or more identifiers associated with misplaced device 102, such as device identifiers (e.g., International Mobile Equipment Identity or IMEI), subscriber identifiers (e.g., an International Mobile Subscriber Identifier or IMSI), rightful user information (such as the rightful user's name, mailing address, e-mail address, alternate addresses, etc.), or other identifiers. Such communication may include any other type of information, such as a location based on the GPS query mentioned above, confirmation that a wipe/encryption process has been initiated, or other information. Misplaced device 102 may transmit such information through any medium or type of communication, such as e-mail, text message, HTML interface, etc.

At 812, such communication is received and processed by misplaced device server 140. At 814, misplaced device server 140 initiates a validation query to ensure that misplaced device 102 is eligible for return as described herein. Such query may seek to validate any number of business rules, such as validating that misplaced device 102 is an existing device, that it is associated with rightful user 104 and that rightful user 104 is an authorized user of network 130, that a services account associated with rightful user 104 is fully paid, etc. At 816, one or more nodes associated with network 130, such as switch 132, HLR/HSS 134, or billing platform 138, receive the query and, at 818, poll its/their relevant databases to obtain the queried information. At 820, such nodes return results to misplaced device server 140 which, at 822, evaluates the received data and, at 824, determines whether misplaced device 102 is eligible to proceed as described herein. If misplaced device 102 is not eligible, then misplaced device server 140 transmits a decline communication to misplaced device 102, at 826. Misplaced device 102 receives such communication at 828 and further processing stops. If misplaced device 102 is eligible, then misplaced device server 140 transmits an accept communication to misplaced device 102, at 832 acknowledging that return of the device will be accepted. Misplaced device 102 receives such communication and, at 834, presents return alternatives.

Figure 8A:
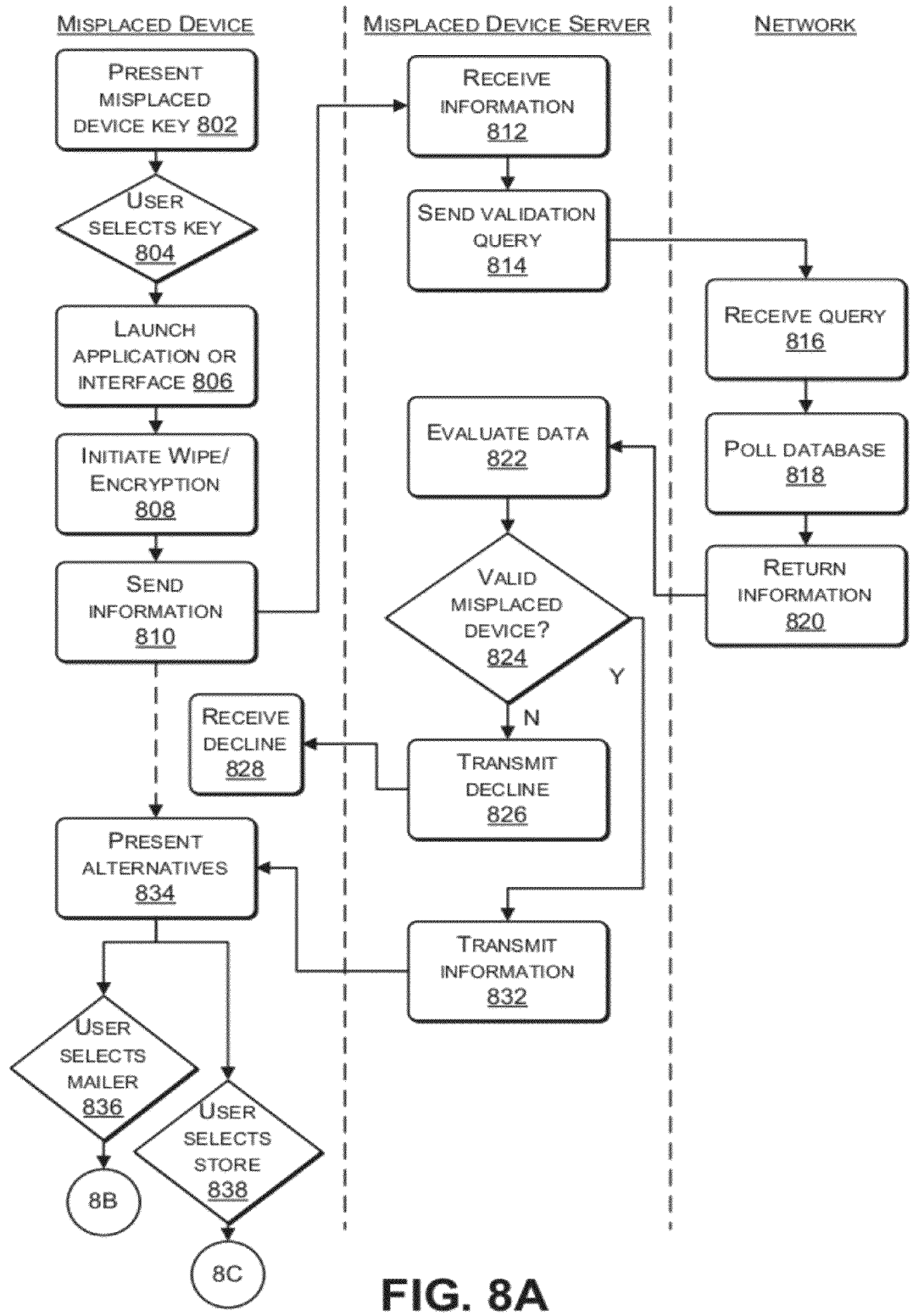
FIGS. 8A, 8B, and 8C are flow charts showing return of a misplaced device as contemplated herein.

At 834, the presented alternatives may include any of a wide variety of return options, including initiating a telephone call directly to rightful user 104, such as via landline phone number 112, or by initiating an e-mail communication to rightful user 104 via e-mail address 110. As shown in FIG. 8A, returning user 120 is presented with two alternatives at 834: a "mailer" option and a "store" option. The "mailer" option includes requesting and receiving a return mailer, by which returning user 120 can place misplaced device 102 into a return mailer envelope and dispatch the envelope via regular mail, overnight courier, etc. The "store" option includes requesting and receiving the location of a retail store location 150 at which returning user 120 can deliver misplaced device 102. As discussed above, the user interface may be presented by an application running on misplaced device 102, or may be presented via a Web browser that is launched upon selection of misplaced device key 118, in which event the user interface may be generated from misplaced device server 140. At 836, returning user 120 indicates his or her desire to receive a mailer as further described in FIG. 8B. At 838, returning user 120 indicates his or her desire to return misplaced device 102 as further described in FIG. 8C.

Figure 8B:
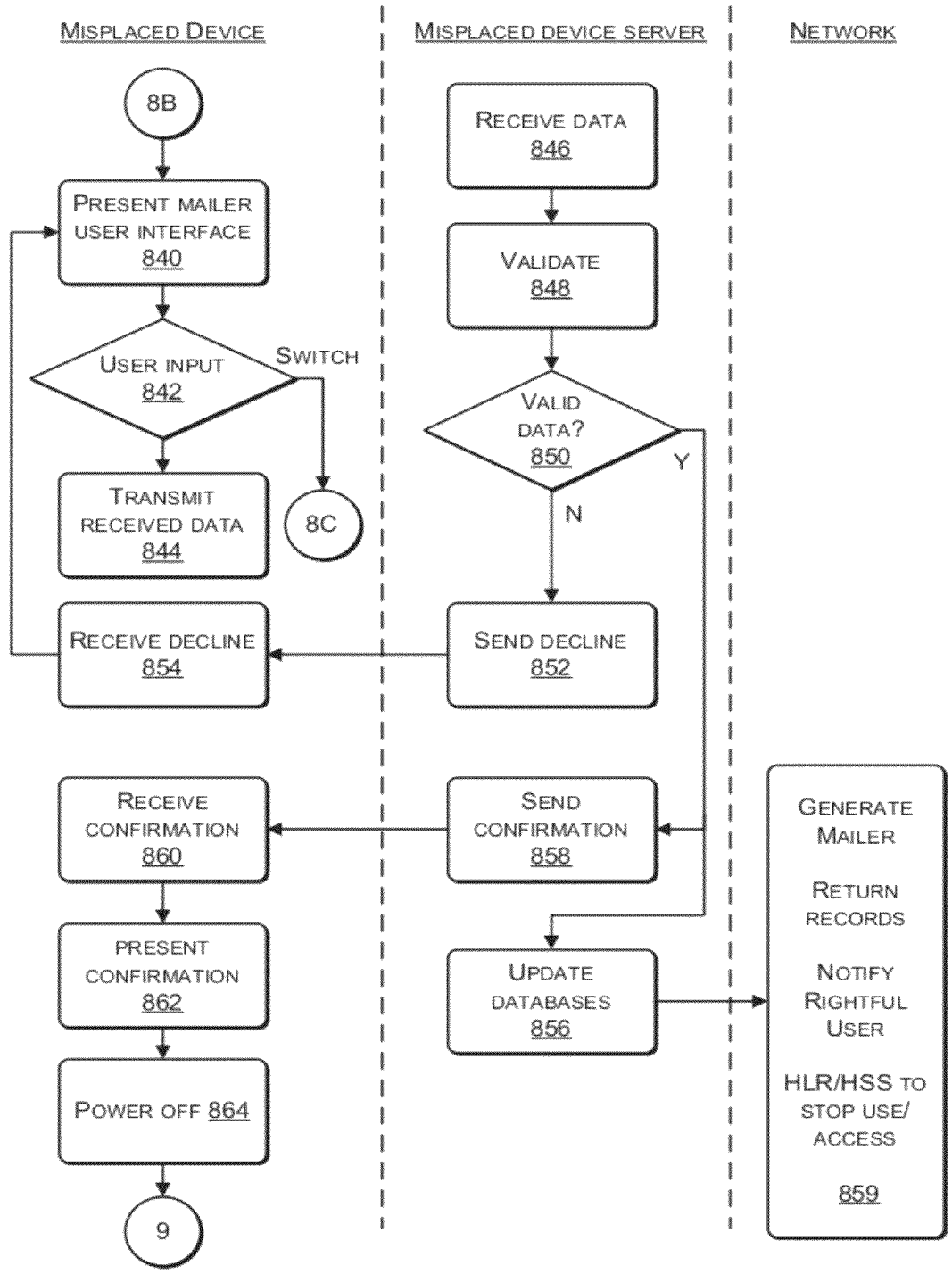

As shown in FIG. 8B, a returning user 120 who has selected the option for receiving a return mailer is presented, at 840, with a mailer user interface. Such user interface may provide information regarding this option, such as describing that a return mailer will be provided to returning user 120 at an address provided by such user. Such user interface will, at minimum, request returning user 120 to provide certain address and other information sufficient for a return mailer to be delivered to returning user 120. The requested information may include the physical mailing address, an e-mail address or other address for returning user 120. The requested information may additionally include a location where returning user 120 found misplaced device 102 and other salient information concerning the circumstances under which returning user 120 found misplaced device 102. At 842, returning user 120 enters information via the user interface and may select "Send" or similar key to indicate his or her completion of the task. In an embodiment, returning user 120 may be presented with an option to switch to the "store" return option as described in FIG. 8C.

At 844, misplaced device 102 transmits the received information to misplaced device server 140, which is received at 846. Misplaced device server 140 may validate the received information based on any of a variety of business rules. In an embodiment, the received information may be verified to ensure that it contains sufficient information for a return mailer to be sent to and received at the entered location. For example, if returning user 120 has entered a physical address, such address may be verified against a database of known physical addresses. Such received information is validated at 848 and a determination is made regarding validity at 850. If the information is not validated, then misplaced device server 140 may generate a decline message and transmit such message to misplaced device 102 at 852. Such message is received by misplaced device 102 at 854. Misplaced device may then represent the mailer user interface at 840, which again requests returning user 120 to enter an address.

If the received information is validated at 850, then misplaced device server 140 may then create one or more return records for transmission to relevant nodes at 856. For example, at 859, a return record may be created sufficient for misplaced device service center 152 to generate and send a return mailer. Additionally, a return record may be created sufficient to update an HLR/HSS 134 to reflect that misplaced device 102 has been found and is expected to be returned to service center 152 via return mailer. Further, a return record may be created and transmitted in a customer-friendly format, such as in an e-mail, to rightful user 104 at his or her e-mail address 110, reflecting that his or her misplaced device 102 has been found and is expected to be returned to service center 152. Such communication may additionally note that the data resident on misplaced device 102 has been wiped or encrypted, enhanced security measures implemented, and other salient information. For example, a return record may be created and transmitted to a customer care location, such as service center 152 or a customer service call center (not shown), which, when received by such location, can be provided to a live human operator, or provided to an IVR system, which initiates a telephonic communication to a phone number or MSISDN 112 associated with rightful user 104, informing him or her that his or her misplaced device 102 has been located and is expected to be returned. These are just a few examples of the types of return records that may be created at 856, and one of skill in the art will appreciate that any type of return records may be created. Additionally, HLR/HSS 134 may remotely shut down misplaced device 102, encrypt the contents of misplaced device 102, wipe clean personal information from misplaced device 102, or the like. Further, in some implementations, the operations of block 859 may be performed in whole or in part by misplaced device server 140 (e.g., by misplaced device component 310), or in whole or in part by other computing devices in the telecommunication network 130, as described above.

At 858, a verification message is sent to misplaced device 102, confirming that the received information is valid. The verification may include other or alternate information, such as a misplaced device unlock security code that may be used to unlock the misplaced device 102 when it is returned to either retail location 150 or service center 152. Such verification is received by misplaced device 102 at 860.

At 862, misplaced device 102 presents a confirmation to returning user 120. Misplaced device 102 may also be updated to make at least one change to its operation. For example, misplaced device 102 may be updated to present immediately, or to present on its next power-up or attempt to unlock, a return security screen that is configured to enable the entry of misplaced device unlock security code. In an embodiment (not shown), return security screen may consist of a locked screen presenting a ten digit keypad (in touch screen embodiments) and/or a field for entry of a return device security code (in touch screen and physical keypad embodiments). Such security screen may be presented immediately to returning user 120, or an alternate screen may be presented conveying information sufficient to notify returning user 120 that, for example, a return mailer will be dispatched to the returning user's address. Such security screen may additionally present information sufficient to inform returning user 120 that misplaced device 102 has been wiped of all personal information relating to rightful user 102, such data has been encrypted, etc.

At 864, misplaced device 102 goes into a sleep mode (such as due to user inactivity) or is powered off. Such transition to sleep mode or powering off may be initiated by returning user 120, or another user, or may occur due to prolonged period of inactivity, in response to presentation of the confirmation to returning user 120, or other means.

Figure 8C:
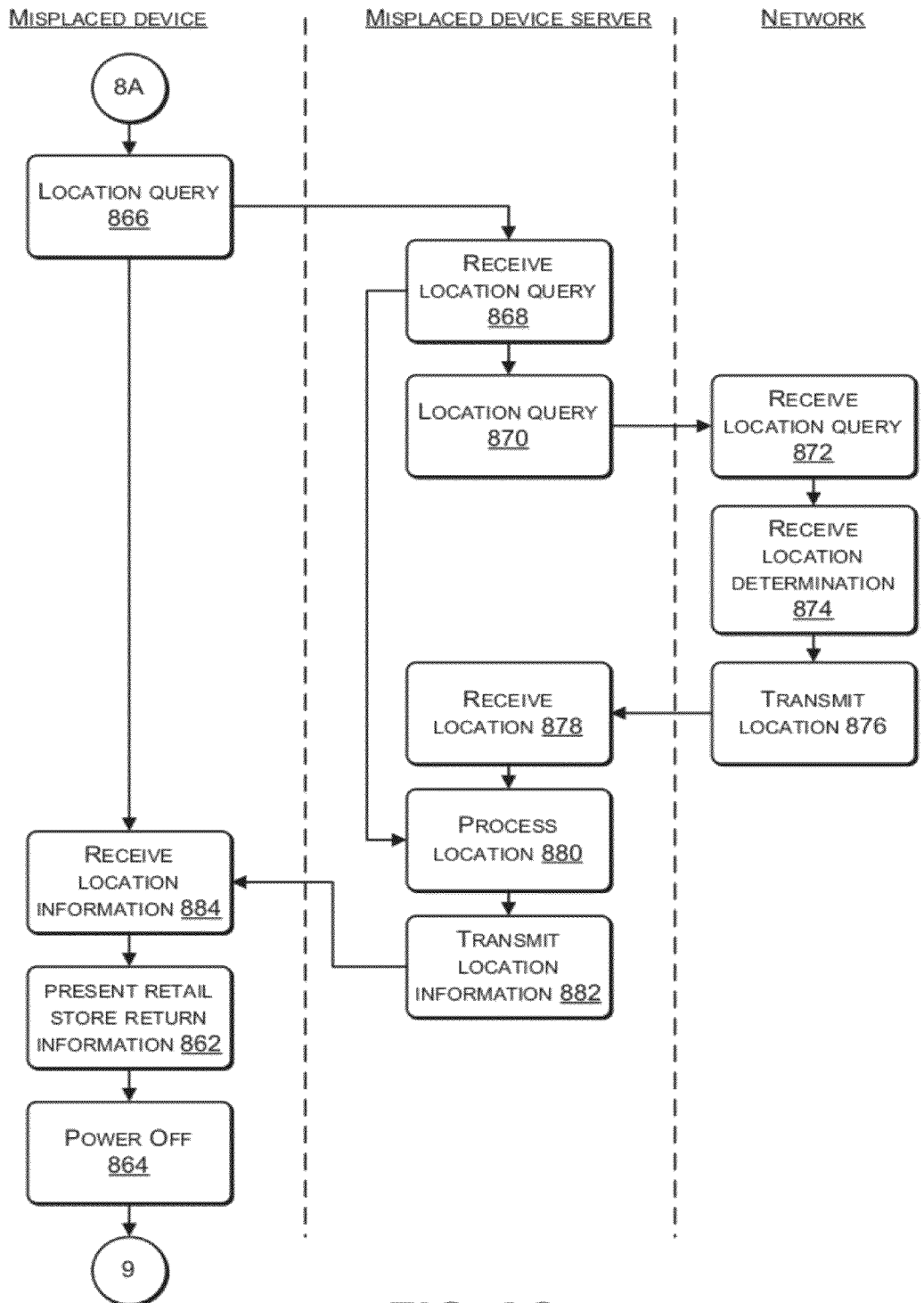

Returning to FIG. 8A, at 838 the returning user 120 may select a "return to store" option, indicating his or her desire to return misplaced device 102 to a retail store or other customer-accessible location 150. As shown in FIG. 8C, at 866, misplaced device 102 will initiate a location query to determine its geographic location. In an embodiment, the location determination may be made by a location platform 136 located external from misplaced device 102. In such embodiment, misplaced device 102 will transmit, at 866, a location query received, at 868, by misplaced device server 140. One of skill in the art will recognize that this location query may also be received directly by location platform 136 or some other node external from misplaced device 102.

At 870, misplaced device server 140 may transmit a location query to location platform 136, which is received by location platform 136 at 872. As mentioned above, location platform 136 may include any type of device location technologies, such as A-GPS (Assisted GPS), TDOA (Time Difference of Arrival), and other technologies. At 874, location platform 136 performs a location determination and, at 876, transmits the result of such determination to misplaced device server 140. One of skill in the art will understand that such message may additionally be transmitted directly to misplaced device 102, or solely to misplaced device 102. At 878, misplaced device server 140 receives the location determination. At 880, misplaced device server 140 processes the received location information vis-à-vis a database of known retail locations 150 to determine one or more nearby retail locations 150 to which returning user 120 may return misplaced device 102. At 882, misplaced device server provides such information to misplaced device 102. In some implementations, the information provided may include one or more of a map, physical address, phone number, or the like.

In an embodiment, misplaced device 102 may have GPS capabilities, such as GPS components 242. In this embodiment, the location query performed at 866 may include this on-board GPS query, in which misplaced device 102 determines its own location. Misplaced device transmits, at 866, this location information to misplaced device server 140, which is received at 868. Misplaced device server 140 recognizes that a location determination has already been provided for misplaced device 102, and proceeds to process the received location information, at 880, vis-à-vis a database of known retail locations 150 to determine one or more nearby retail locations 150 to which returning user 120 may return misplaced device 102. At 882, misplaced device server provides such information to misplaced device 102.

In an embodiment, misplaced device 102 may have GPS capabilities, such as GPS components 242, as well as location data for retail store locations 150. In this embodiment, misplaced device may perform a GPS-based location query at 866, but not provide such location to misplaced device server 140. Misplaced device 102 may perform its own analysis of nearby retail store locations 150, and present such results to returning user 120 at 886. At 888, misplaced device 102 may be configured, in some implementations, to power off following presentation of the retail store location information, such as following a predetermined period of time.

Figure 9:
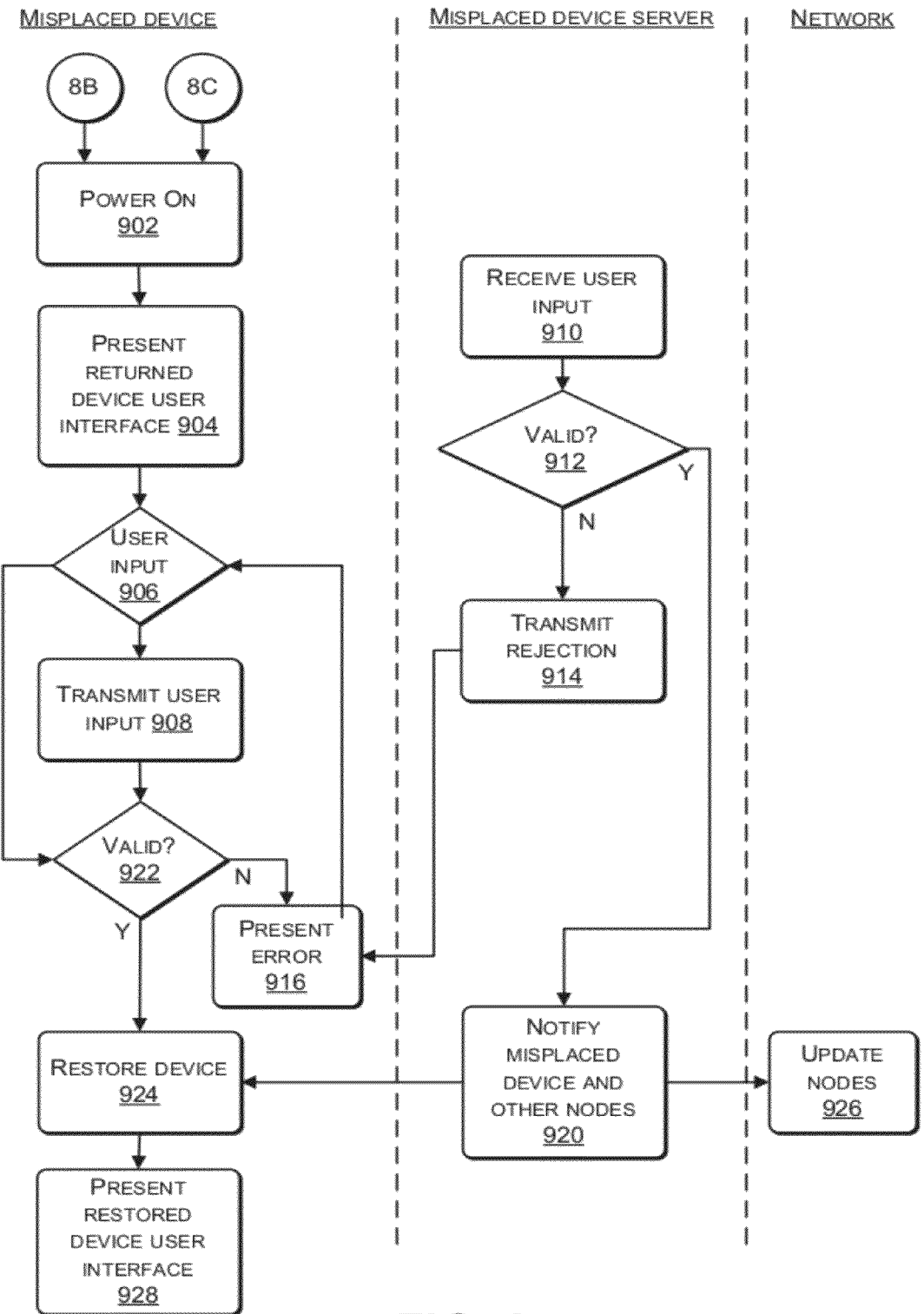
FIG. 9 is a flow chart showing receipt of a misplaced device as contemplated herein.

FIG. 9 shows receipt of a misplaced device 102 as contemplated herein, either at a retail store location 150 or a service center 152. Misplaced device 102 is thus no longer in possession or custody of returning user 120, but has been received at a retail store location 150 or a service center 152. At 902, misplaced device 902 is powered on or woken from a "sleep" mode. At 904, misplaced device 904 presents a returned device user interface. Such user interface may request the user to input a returned device security code or other data input sufficient to validate that misplaced device has been returned and is in the custody and care of a user who is authorized to receive and return misplaced device 102. The returned device user interface may appear substantially like the unlock screen user interfaces presented in FIGS. 4A and 4B, but the inputted security code, unlock design, etc., will be known only to, for example, a telecommunications carrier who provides service to misplaced device 102 or that is otherwise handling return of misplaced device 102.

At 906, the user provides input of an unlock code, design, etc., which, in an embodiment, is provided to misplaced device server 140 for validation at 908. Misplaced device server 140 receives this information at 910 and, at 912, determines whether the received information is valid, such as by matching the received information to known information. If the information is not valid, misplaced device server 140 returns a rejection message to misplaced device 102 at 914, which message is received by misplaced device 102 at 916. Misplaced device 102 may then represent a user interface for the user to again input the security code, design, etc., at 906. If the information is valid, then misplaced device server 140 will provide all needed updates to both misplaced device 102 and other nodes (such as switch 132, HLR/HSS 134, billing platform 138, or other network components,) that misplaced device 102 has been successfully returned and will be provided to rightful user 104.

In an embodiment, the validation information may be resident on misplaced device 102 and, as such, misplaced device 102 need not provide the user inputted information to misplaced device server 140 at 908. In this embodiment, misplaced device evaluates the inputted security code, design, etc., against a known security code, design, etc., at 922. If the information is not valid, misplaced device 102 may again present a user interface for the user to re-input the security code, design, etc., at 906. If the information is valid, then misplaced device 102 will proceed as provided below.

At 924, misplaced device 102 will restore itself to functionality such that rightful user 104 may begin using it upon return. For example, if misplaced device 102 has encrypted data, it may decrypt such data as part of the restoration process at 924. For example, if misplaced device 102 has blocked user access to any or all applications and device functionality, it may unblock such application and functionality at 924. Misplaced device 102 may additionally, at 928, present a restored device message or interface, such that rightful user 104 understands that misplaced device 102 is operational.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The invention claimed is:

1. A method comprising:
    detecting, by a device, selection of a misplaced device key;
    in response to selection of the misplaced device key, sending information from the device to a server over a network, the information including an identification of the device and an indication that a user is initiating return of the device;
    presenting at least one option to the user for returning the device;
    receiving selection of the at least one option to initiate return of the device;
    in response to the selection of the at least one option, presenting a user interface for the user to enter address information to receive a return mailer for returning the device; and
    sending the address information entered by the user to the server to initiate mailing of the return mailer to the user.

2. The method according to claim 1, further comprising receiving a communication from the server indicating at least one of:
    the address information has been validated; or
    confirmation that the mailer will be sent to the address indicated by the address information.

3. The method according to claim 1, further comprising:
    determining a current location of the device; and
    in response to selection of the at least one option, presenting a user interface to the user identifying one or more physical locations to return the device.

4. The method according to claim 3, wherein the user interface presents a map showing the physical locations nearest to the current location for the user to return the device.

5. The method according to claim 3, wherein the current location is determined from at least one of:
    information entered by the user;
    a Global Positioning System reading determined by the device; or
    a location of a network component in communication with the device.

6. The method according to claim 1, wherein the misplaced device key is a virtual button displayed on a touch screen of the device in response to a determination that the device is not under control of a rightful user.

7. The method according to claim 1, further comprising at least one of encrypting or deleting at least a portion of personal information of a rightful user contained on the device.

8. The method according to claim 1, further comprising:
    following return of the device from the user, presenting a user interface that requests a security code to unlock the device; and
    in response to receiving and validating the security code, unlocking the device and notifying one or more network components that the device has been returned.

9. The method according to claim 8, further comprising, following the receiving and validating the security code, restoring the device by decrypting personal information that was encrypted following a determination that the device was not in control of a rightful user.

10. A computing device comprising:
    one or more processors in operable communication with computer-readable media;
    a misplaced device component maintained on the computer-readable media and executed on the one or more processors to perform operations comprising:
        receiving, over a network, a notification from a device, the notification signifying that a user has initiated return of the device;
        transmitting a communication to the device indicating acknowledgment of return of the device; and
        receiving a user selection of an option for returning the device, wherein the user selection of the option for returning the device includes address information of the user; and
        initiating sending a return mailer to an address indicated by the address information of the user.

11. The computing device according to claim 10, wherein:
    the address information includes an e-mail address of the user; and
    the operations for initiating sending a return mailer to the address indicated by the address information include sending virtual shipping materials to the e-mail address of the user.

12. The computing device according to claim 10, further comprising sending a message to a rightful user of the device that return of the device has been initiated.

13. The computing device according to claim 10, wherein the misplaced device component is configured to provide, for user selection, an option for returning the device to a physical location, and to, in response to user selection of the option for returning the device to the physical location, provide the device with one or more physical locations to return the device based on a determined current location of the device.

14. The computing device according to claim 10, the operations further comprising:
    prior to receiving the notification from the device, receiving a report from a rightful user of the device that the device is not in control of the rightful user; and
    sending an instruction to the device to cause the device to display at least one of:
        a misplaced device key; or
        a user interface for initiating return of the device.

15. The computing device according to claim 14, the operations further comprising sending an instruction to a network component to terminate communication capabilities between the device and a third party.

16. One or more computer storage devices having instructions stored thereon executable by a processor to perform operations comprising:
- determining that a device is not in control of a rightful user of the device;
- presenting a user interface on a device, the user interface providing instructions for a returning user to initiate return of the device;
- detecting an action of the returning user to initiate return of the device;
- presenting a user interface for the returning user to enter address information to receive a return mailer for returning the device; and
- sending the address information entered by the returning user to the server to initiate mailing of the return mailer to the returning user.

17. The one or more computer storage devices according to claim 16, the operations further comprising presenting a misplaced device key in the user interface, the misplaced device key selectable by the returning user to initiate the return of the device to the rightful user.

* * * * *